(12) United States Patent
Zeng et al.

(10) Patent No.: US 11,940,537 B2
(45) Date of Patent: Mar. 26, 2024

(54) REAL-TIME VIRTUAL LIDAR SENSOR

(71) Applicant: GM Global Technology Operations LLC, Detroit, MI (US)

(72) Inventors: Wei Zeng, Oakland Township, MI (US); Huabing Zhu, Troy, MI (US); Shuqing Zeng, Sterling Heights, MI (US); Jordan B. Chipka, Commerce Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 190 days.

(21) Appl. No.: 17/545,194

(22) Filed: Dec. 8, 2021

(65) Prior Publication Data

US 2023/0176218 A1 Jun. 8, 2023

(51) Int. Cl.
| | |
|---|---|
| *G01S 17/89* | (2020.01) |
| *G01B 11/22* | (2006.01) |
| *G01S 17/931* | (2020.01) |
| *G06T 7/11* | (2017.01) |
| *G06T 7/521* | (2017.01) |
| *G06T 7/55* | (2017.01) |
| *H04N 23/90* | (2023.01) |

(52) U.S. Cl.
CPC ............ *G01S 17/89* (2013.01); *G01B 11/22* (2013.01); *G01S 17/931* (2020.01); *G06T 7/11* (2017.01); *G06T 7/521* (2017.01); *G06T 7/55* (2017.01); *H04N 23/90* (2023.01); *G06T 2207/10024* (2013.01); *G06T 2207/10028* (2013.01); *G06T 2207/30252* (2013.01)

(58) Field of Classification Search
CPC ....... G01B 11/22; G01S 17/89; G01S 17/931; G01S 17/42; G01S 17/86; G01S 17/87; G06T 2207/10024; G06T 2207/10028; G06T 2207/30252; G06T 7/11
See application file for complete search history.

(56) References Cited

U.S. PATENT DOCUMENTS

| | | | | |
|---|---|---|---|---|
| 2007/0231723 | A1* | 10/2007 | Kimura ................ | G03G 9/0935 430/108.1 |
| 2019/0311546 | A1* | 10/2019 | Tay ...................... | G05D 1/0088 |
| 2021/0042522 | A1* | 2/2021 | Dias Bispo Carvalho ................. | G06T 7/70 |

FOREIGN PATENT DOCUMENTS

CN 101733549 A * 6/2010

* cited by examiner

*Primary Examiner* — Masum Billah
(74) *Attorney, Agent, or Firm* — Vivacqua Crane PLLC

(57) ABSTRACT

A virtual LiDAR sensor system for a motor vehicle includes a plurality of camera modules and algorithms that generate a depth image, a RGB image, and a segmentation information image. The system is implemented with an algorithm that associates the backscattered signals with information from a color-reflectivity table, incident angle determination and depth information.

9 Claims, 4 Drawing Sheets
(2 of 4 Drawing Sheet(s) Filed in Color)

REAL-TIME VIRTUAL LIDAR SENSOR

INTRODUCTION

The present disclosure relates to a sensor for motor vehicles. More specifically, the present disclosure relates to a virtual LiDAR sensor for motor vehicles.

Certain motor vehicles are equipped with cameras and sensors to evaluate the surroundings of the motor vehicle. Moreover, various motor vehicles employ cameras and sensors when cruise control is activated. Particular sensors utilize LiDAR technology that creates a spatial point of the motor vehicle surroundings.

While current systems employing cameras and sensors to provide cruise control and driver assistance achieve their intended purpose, there is a need for a new and improved system to evaluate the surroundings to the motor vehicle.

SUMMARY

According to several aspects, a virtual LiDAR sensor system for a motor vehicle includes a plurality of camera modules and algorithm modules that generate a depth image, a RGB image, and an optional segmentation information image. The algorithms associate the backscattered signals with information from a color-reflectivity table, incident light angle determination and depth information.

In additional aspect of the present disclosure, the three images are captured by a respective camera module, algorithm module, or both.

In another aspect of the present disclosure, the three images are image-pixels that are converted to a 3-d point cloud distribution.

In another aspect of the present disclosure, the system converts the 3-d point cloud into an intensity point cloud.

In another aspect of the present disclosure, the intensity point cloud includes the 3-d point cloud and intensity information.

In another aspect of the present disclosure, the system includes a 3-d projection module to generate the point cloud.

In another aspect of the present disclosure, information from the 3-d projection module is transformed to 3-d coordinates.

In another aspect of the present disclosure, the 3-d coordinates are utilized in an incident angle module that provides incident angle for all individual points in the 3-d point cloud.

According to several aspects, a virtual LiDAR sensor system for a motor vehicle includes a first camera or a first camera system that captures depth of field information of an image, a second camera that captures RGB information of the image, and a third camera or algorithm module that generates semantic segmentation information of the image. The system is implemented with an algorithm that generates a depth and intensity point cloud of the image from the depth of field information, the RGB information and the semantic segmentation information.

In another aspect of the present disclosure, the system includes a 3-d projection module that provides a pattern transformation.

In another aspect of the present disclosure, the pattern transformation includes 3-d coordinates.

In another aspect of the present disclosure, the 3-d coordinates are associated with propagation of a laser beam and backscattering attenuation.

In another aspect of the present disclosure, the 3-d coordinates are transmitted to an incident angle module.

In another aspect of the present disclosure, the incident angle module provides information to a digital reflector.

In another aspect of the present disclosure, the RGB camera provides color information to a color-reflectivity table.

According to several aspects, a virtual LiDAR sensor system for a motor vehicle includes a first module that provides depth of field information of an image, a second module that provides RGB information of the image, a third module that provides semantic segmentation information of the image, a geometry point cloud that receives information from the first module, and a physics module that receives information from the geometry point cloud module and the second and the third modules. The physic module generates a depth and intensity point cloud.

In another aspect of the present disclosure, the physics module includes four sub-modules.

In another aspect of the present disclosure, the four sub-modules include a laser beam propagation sub-module, a backscattering attenuation sub-module, a digital reflector sub-module and a color-reflectivity table sub-module.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way. The patent or application contains at least one drawing executed in color. Copies of this patent or patent application with color drawings will be provided by the U.S. Patent and Trademark Office upon request and payment of the necessary fee.

DETAILED DESCRIPTION

The following description is merely exemplary in nature and is not intended to limit the present disclosure, application, or uses.

Figure 1:
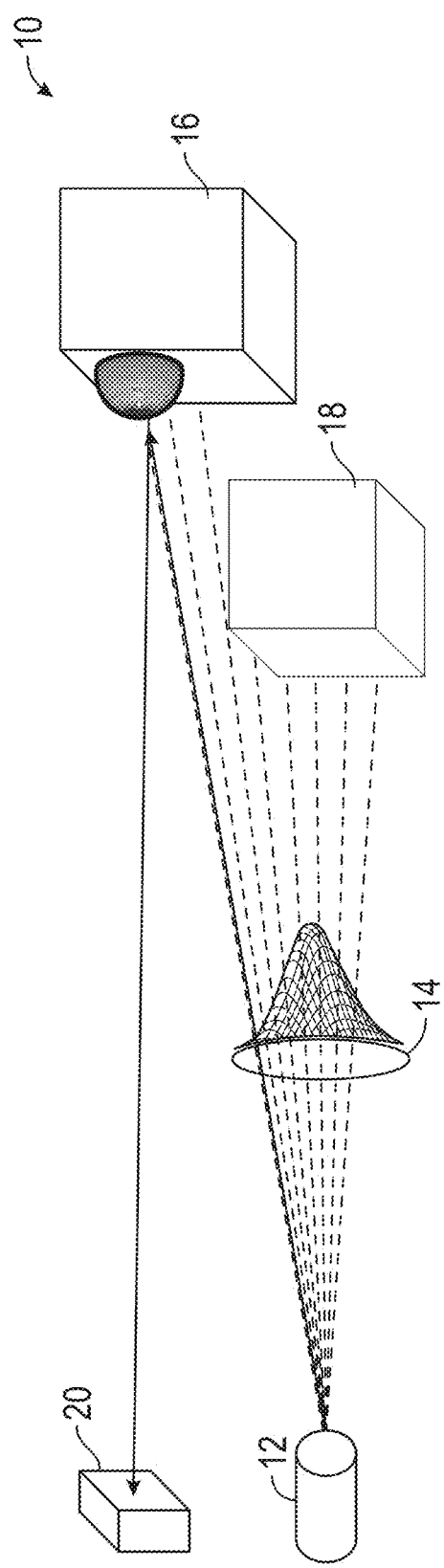
FIG. 1 is a schematic of a LiDAR sensor system.

Referring to FIG. 1, there is shown a typical LiDAR system 10 for a motor vehicle. The LiDAR system 10 includes an emitter 12 that transmits a laser beam 14 towards an object 18 and a reflector 16. The reflector 16 provides backscattering attenuation to a receiver 20. In various implementations, the reflector 16 is a Lampert reflector.

Figure 2:
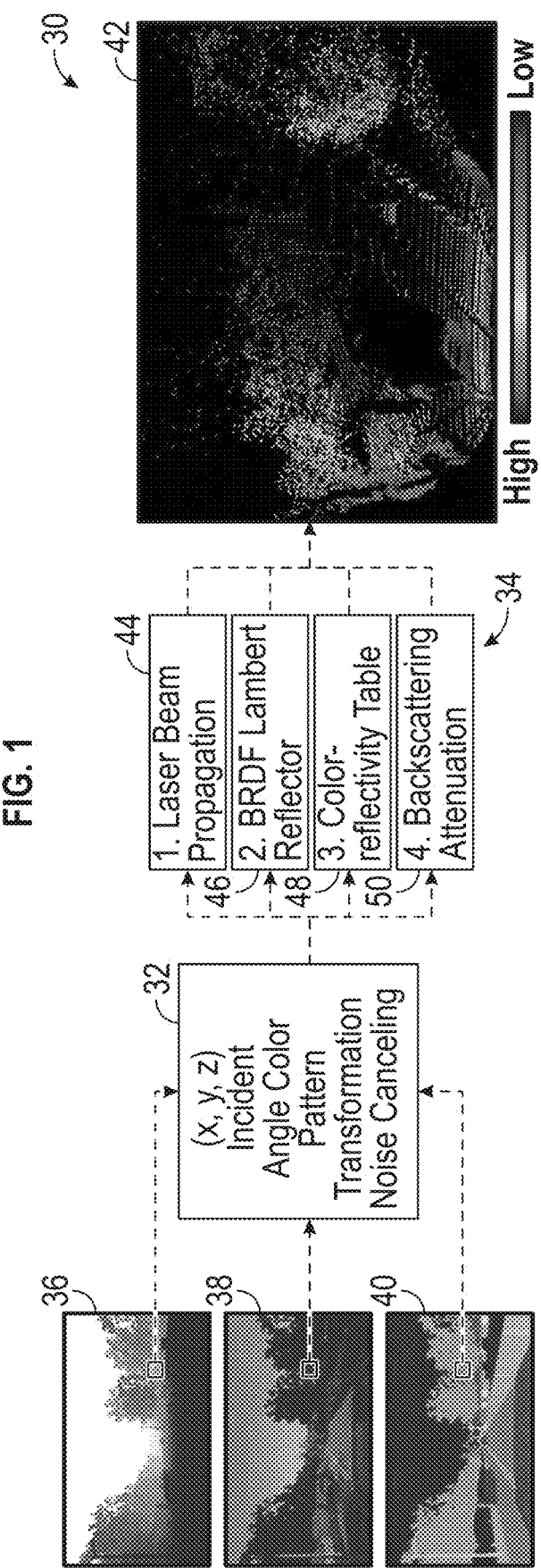
FIG. 2 is a block diagram of the overall implementation of a virtual LiDAR system according to an exemplary embodiment.

Referring further to FIG. 2, there is shown a virtual LiDAR system 30 for a motor vehicle, in contrast to the system 10 shown in FIG. 1, in accordance with the principles of the present disclosure. The system 30 includes a set of modules to generate an intensity point cloud (x,y,x,i) 42. The set of modules 30 includes a first camera module 36 that captures a depth of field of an image of an object; a second camera module 38 that captures RGB information of the image; and a third camera module 40 that provides semantic segmentation information of the image. The information from the camera modules 36, 38 and 40 is transmitted to a conversion module 32.

The conversion module 32 converts the image-pixel information form the camera modules 36, 38 and 40 to a 3-d (x,y,x) point cloud. The conversion module 32 further determines the incident angle of the laser beam 14 upon the reflector 16, color information, pattern transformation and noise cancellation of the image.

Figure 3A:
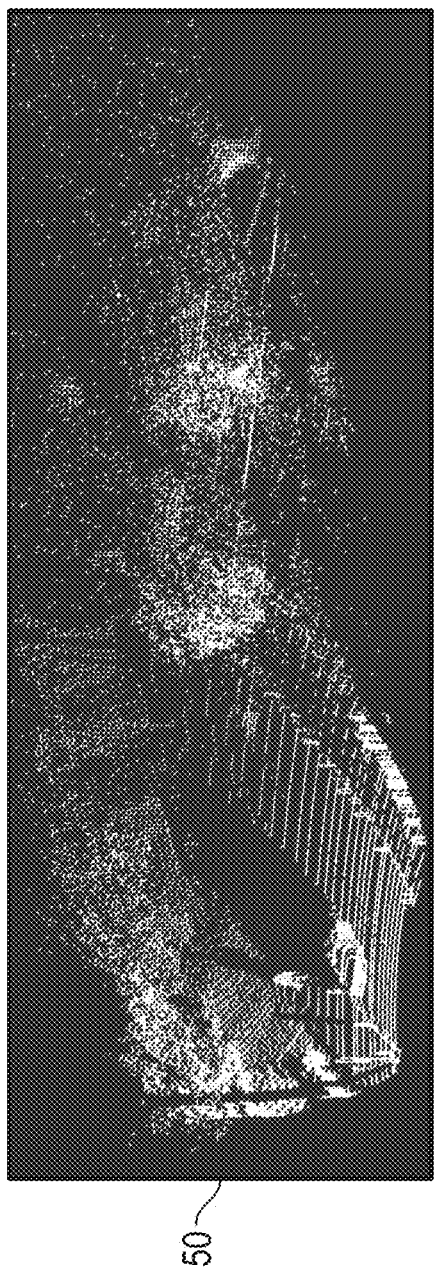
FIGS. 3A and 3B show a comparison between conventional LiDAR and the LiDAR system shown in FIG. 2.
Figure 3B:
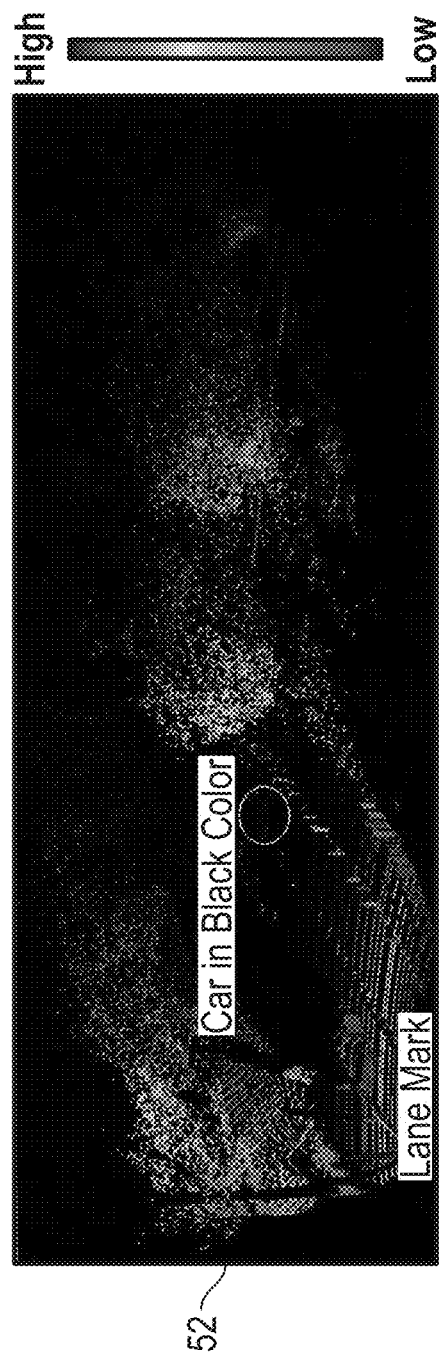

Information provided by the module 32 is transmitted to a set of physics modules 34, including a laser beam propagation sub-module 44, a bidirectional reflectance distribution function (BRDF) Lampert reflector module 46, a color reflectivity module 48 and a backscattering attenuation module 50. The set of physics modules 34 then generate the intensity point cloud 42. The intensity point cloud (x,y,z,i) 42 includes spatial information (x,y,z) as well as the intensity of the image, which is indicated by RGB color variations shown in the intensity point cloud (x,y,z,i). As an example, high intensity is indicated in red and low intensity is indicated in blue. For the comparative purposes, FIG. 3A shows a 3-d point cloud 50 with spatial features (x,y,z) and FIG. 3B shows the 3-d point cloud along with intensity information to provide an intensity point cloud 52 with spatial and intensity features (x,y,z,i).

In various arrangements, the camera modules 36, 38 and 40, the conversion module 32 and the physics module 34 are controlled by an algorithm implanted in an electronic control unit (ECU) situated, for example, in a motor vehicle. The ECU is a non-generalized, electronic control device having a preprogrammed digital computer or processor, memory or non-transitory computer readable medium used to store data such as control logic, software applications, instructions, computer code, data, lookup tables, etc., and a transceiver. Computer readable medium includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device. Computer code includes any type of program code, including source code, object code, and executable code. The processor is configured to execute the code or instructions.

The algorithm in various arrangements is an application implemented as a software program configured to perform a specific function or set of functions. The application may include one or more computer programs, software components, sets of instructions, procedures, functions, objects, classes, instances, related data, or a portion thereof adapted for implementation in a suitable computer readable program code. The applications may be stored within the memory or in additional or separate memory.

Figure 4:
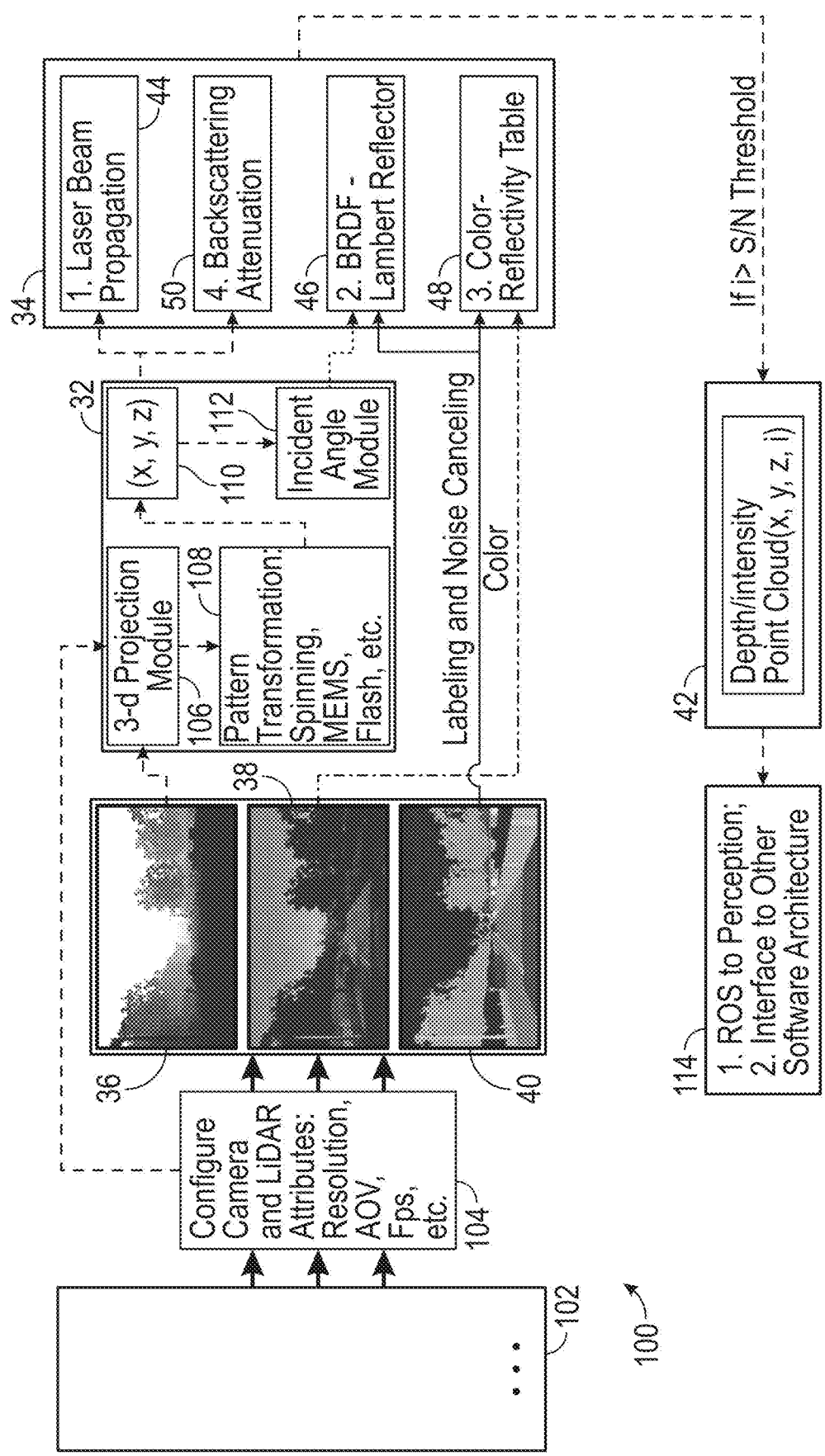
FIG. 4 is a block diagram of the detailed implementation of the system shown in FIG. 2.

Referring to FIG. 4, there is shown a modeling/simulation arrangement 100 of the system 10 (FIG. 1) and modules 30 (FIG. 2). The arrangement 100 includes a simulator 102 that transmits information to a configuration module 104. The configuration module 104 configures the camera modules 36, 38 and 40 and the LiDAR attributes, such as, for example, resolution, AOV and fps.

Information from the configuration module 104 and the depth of field camera module 36 is relayed to a 3-d projection module 106. Output from the 3-d projection module 106 is transmitted to a pattern transformation module 108, which provides a spatial (x,y,z) point cloud 110. An incident angle module 112 determines the angle of incident of the laser beam on the BRDF Lambert reflector. Information from the conversion module is transmitted to the laser beam propagation sub-module 44, the backscattering attenuation sub-module 50 and the BRDF Lambert reflector sub-module 46 of the physics module 34. Color information from the RGB camera module 38 is transmitted to the color-reflectivity table sub-module 48. Labeling and noise cancellation information from the segmentation camera module 40 is transmitted to the BRDF Lambert reflector sub-module 46 and color-reflectivity table sub-module 48.

If the intensity information from the physics module 34 exceeds a signal to noise (S/N) threshold, this information is utilized to generate the intensity point cloud 42 with spatial and intensity information. In various arrangements, information associated with the intensity point cloud 42 is utilized in an interface with other software architecture 114.

Figure 5:
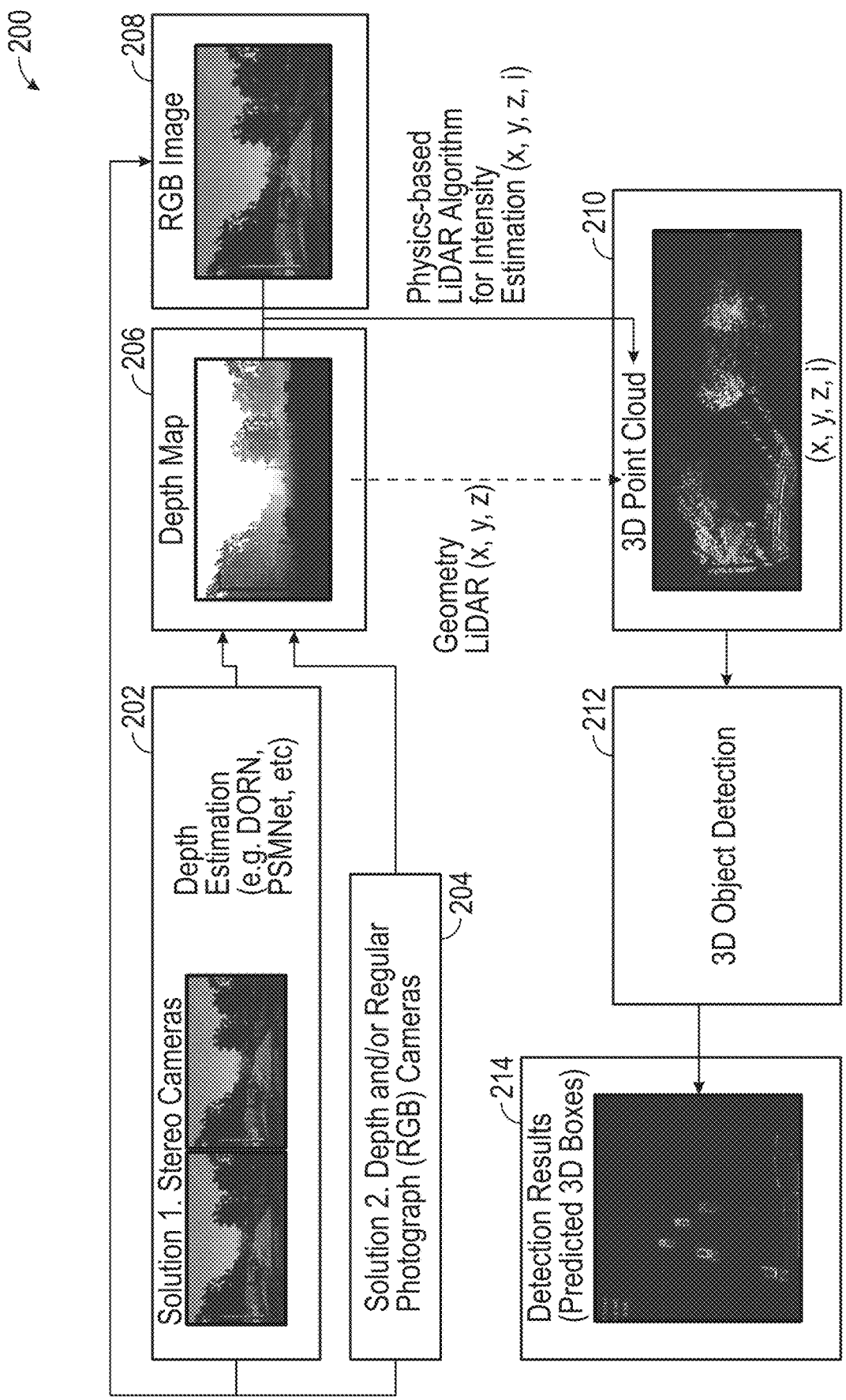
FIG. 5 is a block diagram describing the virtual LiDAR system shown in FIG. 2 for in-vehicle perception.

Turning now to FIG. 5, there is shown the system 10 (FIG. 1) and modules 30 (FIG. 2) implemented as an in-vehicle perception arrangement 200. The arrangement 200 includes a module 202 with stereo cameras that provide a depth estimation. Alternatively, the arrangement 200 also includes a module 204 with depth and/or regular photograph (RGB) cameras. Information from either module 202 or module 204 is relayed to a module 206 that generates a depth map and a module 208 that generates a RGB image.

Geometric information (x,y,z) of the depth map is relayed from the module 206 to a module 210. Further, the physics-based algorithm described earlier utilizes information from the modules 206 and 208 to provide an intensity estimation (x,y,z,i) to the module 210. The module 210 then generates a 3-d point cloud with spatial information and intensity information. The 3-d point cloud generated in the module 210 is utilized in a 3-d objection detection module 212, and the objects detected in the 3-d detection module are sent to a detection results module 214.

A virtual LiDAR system of the present disclosure offers several advantages. These include utilizing time-of-flight attributes and simplified laser physics. Further, the virtual generation of a LiDAR point cloud with intensity information achieves enhanced 3-d perception performance.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:
1. A virtual LiDAR sensor system for a motor vehicle, the system comprising:
a first camera or a first camera system that captures depth of field information of an image;
a second camera that captures RGB information of the image; and
a third camera that generates semantic segmentation information of the image;
a geometry point cloud that receives depth of field information from the first camera; and
a physics module that receives information from the geometry point cloud module, the second camera and the third camera, the physics module including a laser beam propagation sub-module, a backscattering attenuation sub-module, a digital reflector sub-module and a color-reflectivity table sub-module, wherein the physics module generates a depth and intensity point cloud of the image from the depth of field information, the RGB information and the semantic segmentation information.

2. The system of claim 1, wherein the system includes a 3-d projection module that provides a pattern transformation.

3. The system of claim 2, wherein the pattern transformation includes 3-d coordinates.

4. The system of claim 3, wherein the 3-d coordinates are associated with propagation of a laser beam and backscattering attenuation.

5. The system of claim 3, wherein the 3-d coordinates are transmitted to an incident angle module.

6. The system of claim 5, wherein the incident angle module provides information to a digital reflector.

7. The system of claim 1, wherein the RGB camera provides color information to a color-surface reflectivity table.

8. A virtual LiDAR sensor system for a motor vehicle, the system comprising:

a first module that provides depth of field information of an image;

a second module that provides RGB information of the image;

a third module that provides semantic segmentation information of the image;

a geometry point cloud that receives information from the first module; and a physics module that receives information from the geometry point cloud module and the second and the third modules, wherein the physics module includes four sub-modules, and wherein the physic module generates a depth and intensity point cloud.

9. The system of claim 8, wherein the four sub-modules include a laser beam propagation sub-module, a backscattering attenuation sub-module, a digital reflector sub-module and a color-reflectivity table sub-module.

* * * * *